United States Patent Office 2,914,505
Patented Nov. 24, 1959

2,914,505

PLASTIC COMPOSITIONS COMPRISING BLENDS OF AN ELASTOMER AND CERTAIN TRIPOLYMERS AND PROCESS FOR PREPARING SAME

Alec Norman Roper, Eccles, Manchester, Ernest Seijo, Sale, and Wolfgang Gersen Barb, Surbiton, England No Drawing. Application April 12, 1957
Serial No. 652,337

10 Claims. (Cl. 260—45.5)

This invention relates to improved plastic compositions. More particularly, the invention relates to tough plastic compositions of the kind comprising a diolefin-acrylic nitrile rubber.

Specifically, the invention provides improved plastic compositions comprising a blend of an elastomer comprising a diolefin-acrylic nitrile copolymer with a ternary copolymer of (a) an alkenyl-substituted aromatic compound, (b) an alpha,beta-ethylenically unsaturated nitrile, and (c) an ethylenically unsaturated anhydride.

It is known that tough plastic compositions can be obtained by the blending of a styrene-acrylonitrile copolymer with a butadiene-acrylonitrile rubber or elastomeric copolymer. Various suggestions have been made for improving the properties of such blends. Among these is the blending of the styrene-acrylonitrile copolymer with two butadiene-acrylonitrile rubbers of different acrylonitrile contents or with a butadiene-acrylonitrile rubber in conjunction with a natural rubber, a polybutadiene, a styrene-butadiene rubber or an acrylate rubber. Pretreatment of the rubber component in various ways, e.g. by hot milling has also been suggested. The compositions produced by these known methods have relatively low softening points, viz., in the region of 100° C. and are, accordingly, unsuitable for many applications, particularly where contact with very hot or boiling water is involved.

It is therefore an object of the invention to provide a new class of improved plastic products. It is a further object to provide new plastic products of the kind comprising a diolefin-acrylic nitrile rubber. It is a further object to provide new plastic products containing a diolefin-acrylic nitrile rubber having enhanced softening points. It is a further object to provide new plastic products made up of blends of different copolymers. Other objects and advantages of the invention will be apparent from the following detailed description thereof.

It has now been discovered that these and other objects may be accomplished by the compositions of the invention comprising a blend of certain amounts of an elastomer comprising a diolefin-acrylic nitrile copolymer with a ternary copolymer of (a) an alkenyl-substituted aromatic compound, (b) an alpha,beta-ethylenically unsaturated nitrile, and (c) an ethylenically unsaturated anhydride. It has been found that these particular compositions are very tough and have unexpectedly high softening points. Evidence of these superior properties is shown in the examples at the end of the specification.

The elastomer used in the preparation of the novel compositions of the present invention include the elastomeric copolymers of a diolefin and an acrylic nitrile. The preferred diolefins are the aliphatic conjugated diolefins having 4 to 6 carbon atoms, such as butadiene, isoprene, methyl pentadiene, dimethyl butadiene and the like. The acrylic nitrile is preferably acrylonitrile. The diolefin preferably makes up at least 40% and more preferably 60% to 80% of the copolymer. These copolymers preferably have molecular weights varying from about 5,000 to 500,000 as determined by the light scattering technique described in Chem. Rev., vol. 40, page 319 (1948). Molecular weight may be controlled by the conventional use of chain transfer agents, such as isopropyl alcohol. The elastomeric copolymers may be prepared by any conventional method. Preferred methods of preparation are described in U.S. 2,556,851 and U.S. 2,618,626.

Other elastomers may be used in combination with the above-described diolefin-acrylic nitrile copolymer. This includes natural rubber as well as other synthetic rubbers, such as butadiene-styrene copolymers which are manufactured commercially under such names as GR-S 1000, GR-S 1500, GR-S 1600, GR-S 2000, GR-S 2101 and the like, as well as rubbery copolymers of butadiene and methyl methacrylate, 3,4 - dichloroalpha-methylstyrene, methyl isopropenyl ketone, vinyl pyridine and other related unsaturated monomers. Other synthetic rubbers include the neoprene rubbers, i.e. rubbers prepared from chloroprene, such as those known commercially as GR–M, neoprene type Gn, neoprene type E, neoprene FR and the like. Isobutylene rubbers, such as those known in industry as GR–1 rubbers, are also useful. These dissimilar elastomeric materials are preferably used to replace a minor portion of the diolefin-acrylic nitrile rubber and preferably from 1% to about 40% of the diolefin-acrylic nitrile rubber.

The ternary copolymers used in the preparation of the compositions of the invention are those obtained by the copolymerization of (a) an alkenyl-substituted aromatic compound, (b) an alpha,beta-ethylenically unsaturated nitrile, and (c) an ethylenically unsaturated anhydride. The alkenyl-substituted aromatic compounds are those having an alkenyl group, and preferably a $CH_2=C<$ group, attached directly to an aromatic ring, such as styrene, alpha-methylstyrene, vinylnaphthalene, dimethylstyrene, vinyl toluene, 3,4-diethylstyrene and the like. $CH_2=C<$ aromatic compounds having from 8 to 16 carbon atoms, and especially styrene are particularly preferred.

The alpha,beta-ethylenically unsaturated nitriles used in preparing the ternary copolymers are preferably those of the formula

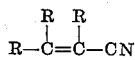

wherein R may be hydrogen or hydrocarbon, and preferably an aliphatic hydrocarbon radical, such as acrylonitrile, alpha-ethyl acrylonitrile, beta-ethyl acrylonitrile, alpha-hexyl acrylonitrile, methacrylonitrile, alpha-cyclohexyl acrylonitrile and the like. Nitriles of the above formula wherein R is hydrogen or alkyl radicals containing from 1 to 4 carbon atoms are particularly preferred.

The third monomer used in making the ternary copolymers is an ethylenically unsaturated anhydride, i.e. compounds possessing a $>C=C<$ group and an anhydride group which is preferably contained in a ring structure, e.g. a structure such as

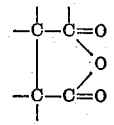

The double bond may be present in a side chain or may be contained in a ring structure. Examples of these unsaturated anhydrides include, among others, maleic anhydride, chloromaleic anhydride, butenylsuccinic anhydride, citraconic anhydride, tetrahydrophthalic anhydride, 3,5-dimethyltetrahydrophthalic anhydride, 3,5-dichlorotetrahydrophthalic anhydride, 3 - acetoxy - 3,5 - dimethyltetrahydrophthalic anhydride, and the like. Especially preferred are the aliphatic and cycloaliphatic monoethylenically unsaturated anhydrides and their halo- and alkyl-substituted derivatives, which preferred anhydrides preferably contain up to 18 carbon atoms.

The ternary copolymers are preferably made up in the following proportions:

| | Percent by weight |
|---|---|
| (a) Alkenyl-substituted aromatic compound | 50 to 80 |
| (b) Alpha,beta-unsaturated nitrile | 15 to 40 |
| (c) Ethylenically unsaturated anhydride | 5 to 35 |

Particularly preferred amounts vary from 60% to 80% for the aromatic compound, 20% to 40% for the nitrile and 20% to 35% for the anhydride.

The molecular weight of the ternary copolymers preferably varies from 5,000 to about 250,000, and still more preferably from 5,000 to 100,000 as determined by the light scattering technique. The molecular weight can be controlled by conventional means, such as control over polymerization temperature, type and amount of catalyst and use of solvents and chain transfer agents.

The ternary copolymers may be prepared by any suitable method. They may be prepared, for example, by heating the monomers in a suitable medium in the presence of a polymerization catalyst. They may be prepared in bulk, solvent solution or aqueous suspension or emulsion systems, but are more preferably prepared in an aqueous emulsion using any of the conventional emulsifying agents, such as, for example, soaps, like sodium and potassium myristate, laurate, palmitate, oleate, stearate, rosinate, or alkali metal alkyl or alkylene sulfates or sulfonates, such as sodium and potassium lauryl sulfate, sulfonated Turkey red oil, sulfonated mineral oils, etc. Ordinarily, about 2% to 5% of the emulsifying agent or mixtures thereof in the aqueous phase are suitable.

Polymerization initiators that are particularly suited for use in preparing the ternary polymers include various free-radical yielding catalysts as peroxide catalyst, such as for example, benzoyl peroxide, lauroyl peroxide, tertiary butyl hydroperoxide, 2,2-bis-(tertiary butyl peroxy) butane, di(tertiarybutyl) peroxide, tertiary butyl perlargonate, hydrogen peroxide, sodium, potassium or ammonium persulfate, percarbonate, peracetic acid, and the like. Other suitable catalysts include azo compounds, such as alpha,alpha-azodiisobutyronitrile and the like. In general, the amount of initiator added will vary from 0.1% to 5% by weight of the material being polymerized. Preferred amounts vary from 0.1% to 2% by weight.

As the three monomers selected may have different polymerization rates, the proportions in which they enter the copolymer molecule may differ from the proportions in which they occur in the reaction mixture. It will be necessary, therefore, to determine beforehand the ratio of concentrations of monomers needed to give copolymers having the three monomers in the above-noted ratios. This can be easily accomplished by conducting a few routine runs and examining the composition of the resulting copolymer. The initial concentration of monomers can then be adjusted so as to give the copolymer of the desired composition.

As the reaction progresses, the monomer concentration ratios may change due to the difference in the rate of polymerization and, in some cases, the ratio will change so that it will be producing copolymers having the above-described ratio. This can be corrected by adjusting the ratio of monomer concentrations during the course of the polymerization by adding more of one, two or all three of the monomers.

The temperature selected for the copolymerization will vary depending chiefly on the type of polymerization catalyst selected, the desired rate of reaction and the molecular weight desired. Generally, the temperature will range from about 15° C. to 200° C. and more preferably from 20° C. to 150° C.

The polymerization may be conducted in the presence or absence of air. In some cases, it has been found desirable to conduct the polymerization in the presence of an inert gas, such as nitrogen. Atmospheric, reduced or superatmospheric pressures may be used as desired.

At the end of the polymerization, the ternary copolymers may be seperated from the reaction mixture, or as in the case of emulsion systems, the emulsion may be maintained and used as such in the preparation of the blends as noted hereinafter. In case of bulk or solvent polymerization, the unreacted monomers and/or solvent are preferably removed by distillation or precipitation with appropriate means, and the recovered copolymer then used in the formation of the blends.

The elastomer and the ternary copolymer are combined in proportions varying from 10 to 40 parts of the diolefin-acrylic nitrile copolymer to 60 to 90 parts of the ternary copolymer, and still more preferably from 20 to 40 parts of the diolefin-nitrile copolymer and 60 to 80 parts of the ternary copolymer.

The blending of the ternary copolymer with the diolefin acrylic nitrile elastomer, and, if present, other elastomers, may be carried out by mechanical means, e.g. by the use of a two-roll mill or a Bridge Banbury mixer. The milling may be done at room temperature at elevated temperatures, e.g. temperatures from 80° C. to 175° C. The components may also be pretreated for example, as by hot milling.

Blending may also take place by mixing latices of the ternary copolymer and the elastomer or elastomers and then coagulating or drying the mixed latex. The coagulation of the latices may be accomplished by conventional means, such as by addition of alcohols, acids, salts, and the like.

Stablizers, pigments and other additives may be incorporated in the compositions of the invention in known fashion.

The compositions of the invention possess the desirable physical properties of similar compositions formed with a binary styrene-acrylonitrile copolymer, but also possess the advantage of enhanced softening points. They are thus particularly suited for use in making molded articles where heat resistance is a highly desirable property. They may be used in making molded articles for electrical equipment, as well as in the manufacture of articles for household appliances, toys and the like.

The invention is illustrated by the following examples in which all "parts" are parts by weight.

*Example 1*

This example illustrates the preparation and some of the properties of a composition prepared from a copolymer of butadiene and acrylonitrile and a ternary copolymer of styrene, acrylonitrile and chloromaleic anhydride.

60 parts of styrene, 20 parts of acrylonitrile and 20 parts of chloromaleic anhydride were combined and 0.5% of azo-bis-isobutyronitrile added thereto. This mixture was heated at 60° C. for 6 hours followed by heating at 100° C. for 24 hours. The polymer obtained was ground and then milled on a 2-roll mill at 160° C. 35 parts of Hycar 1411 (a commercial butadiene-acrylonitrile rubber containing 40% acrylonitrile and 60% butadiene and having a molecular weight of about 200,000) were added in small portions over the course of 5 minutes. The mixture was milled for an additional 5 minutes and then stripped off the rolls.

Material molded from this blend was exceptionally tough and softened some 20° C. higher than material made from a similar blend in which the copolymer constituent blended with the elastomer contained 75 parts styrene and 25 parts acrylonitrile only, with no third monomer.

Related results are obtained by replacing the chloromaleic anhydride in the above process with equal amount of each of the following: tetrahydrophthalic anhydride, 3,5-dimethyltetrahydrophthalic anhydride, chlorotetrahydrophthalic anhydride, maleic anhydride, and 3-acetoxy-3,5-dimethyltetrahydrophthalic anhydride.

*Example II*

A copolymer containing 60 parts styrene, 20 parts acrylonitrile and 20 parts of tetrahydrophthalic anhydride is prepared by mass polymerization method as shown in Example I.

90 parts of this ternary copolymer are milled on a 2-roll mill at 160° C. 25 parts of a copolymer of 60% butadiene and 40% acrylonitrile and 6.5 parts of a copolymer of 80% styrene and 20% butadiene are slowly added in small portions over a course of 5 minutes. The mixture is then milled for an additional 5 minutes and then stripped off the rolls.

Materials molded from this blend are exceptionally tough and have a much higher softening point than materials made from a similar blend in which the copolymer constituent blended with the elastomers contain 75 parts styrene and 25 parts acrylonitrile.

Related results are obtained by replacing the 6.5 parts of an elastomeric copolymer of styrene and butadiene in the above process with equal amounts of each of the following: copolymer of 50 parts styrene and 50 parts butadiene, copolymer of 80 parts butadiene and 20 parts vinyl pyridine and a copolymer of butadiene and methyl methacrylate.

*Example III*

A copolymer containing 50 parts styrene, 35 parts acrylonitrile and 15 parts maleic anhydride is prepared by mass polymerization method as shown in Example I.

70 parts of this ternary copolymer are milled on a 2-roll mill at 160° C. 30 parts of a copolymer of 65% mixture of butadiene and isoprene and 35% acrylonitrile are added in small portions over a course of 5 minutes. The mixture is then milled for an additional 5 minutes and then stripped off the rolls.

Materials molded from this blend are exceptionally tough and have a much higher softening point than materials made from a similar blend in which the copolymer constituent blended with the elastomers contain 75 parts of styrene and 25 parts acrylonitrile.

Repeated results are obtained by replacing the maleic anhydride in the above process with equal amounts of each of the following: chlorotetrahydrophthalic anhydride, dichloromaleic anhydride and citraconic anhydride.

We claim as our invention:

1. A plastic composition comprising a blend of 10 to 40 parts of an elastomeric copolymer of a conjugated diolefin and acrylonitrile with 60 to 90 parts of a ternary copolymer of (a) 50% to 80% of an alkenyl-substituted aromatic compound of the group consisting of styrene, alpha-methylstyrene, vinyl naphthalene, dimethylstyrene, vinyl toluene and 3,4-diethylstyrene, (b) 15% to 40% by weight of an alpha, beta-ethylenically unsaturated nitrile having the formula

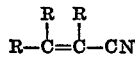

wherein R is a member of the group consisting of hydrogen and hydrocarbon radicals, and (c) 5% to 35% by weight of an ethylenically unsaturated anhydride of a dicarboxylic acid.

2. A plastic composition comprising a blend of 10 to 40 parts of a butadiene-acrylonitrile copolymer with 60 to 90 parts of a ternary copolymer of (a) 50% to 80% by weight of an alkenyl-substituted aromatic compound of the group consisting of styrene, alpha-methylstyrene, vinyl naphthalene, dimethylstyrene, vinyl toluene and 3,4-diethylstyrene, (b) 15 to 40% by weight of an alpha, beta-ethylenically unsaturated nitrile having the formula

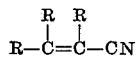

wherein R is a member of the group consisting of hydrogen and hydrocarbon radicals, and (c) 5% to 35% of an ethylenically unsaturated anhydride of a dicarboxylic acid.

3. A plastic composition as in claim 2 wherein the unsaturated anhydride is maleic anhydride.

4. A plastic composition as in claim 2 wherein the unsaturated anhydride is chloromaleic anhydride.

5. A plastic composition as in claim 2 wherein the unsaturated anhydride is tetrahydrophthalic anhydride.

6. A plastic composition as in claim 2 wherein the alkenyl-substituted aromatic compound is styrene.

7. A plastic composition as in claim 2 wherein the unsaturated nitrile is acrylonitrile.

8. A blend of 10 to 40 parts of a butadiene-acrylonitrile copolymer containing at least 40% butadiene units with from 60 to 90 parts of a ternary copolymer of (a) 50 to 80% by weight of styrene, (b) 15 to 40% by weight of acrylonitrile and (c) 5 to 35% by weight of chloromaleic anhydride.

9. A process for preparing plastic compositions having enhanced softening points which comprises milling 10 to 40 parts of an elastomeric copolymer of a conjugated diolefin and acrylonitrile with 60 to 90 parts of a ternary copolymer of (a) 50% to 80% by weight of an alkenyl-substituted aromatic compound of the group consisting of styrene, alpha-methylstyrene, vinyl naphthalene, dimethylstyrene, vinyl toluene and 3,4-diethylstyrene, (b) 15% to 40% by weight of an alpha,beta-ethylenically unsaturated nitrile having the formula

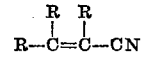

wherein R is a member of the group consisting of hydrogen and hydrocarbon radicals, and (c) 5% to 35% by weight of an ethylenically unsaturated anhydride of a dicarboxylic acid.

10. A process as in claim 9 wherein the milling is accomplished by milling the copolymers together at a temperature between 90° C. and 175° C.

References Cited in the file of this patent

UNITED STATES PATENTS

| | | |
|---|---|---|
| 2,573,273 | Porth | Oct. 30, 1951 |
| 2,614,093 | Wheelock | Oct. 14, 1952 |